(12) United States Patent
Carcouet et al.

(10) Patent No.: US 7,961,486 B2
(45) Date of Patent: Jun. 14, 2011

(54) CAPACITIVE POWER SUPPLY SYSTEM

(75) Inventors: Sebastien Carcouet, Vif (FR); Didier Leonard, Seyssinet-Pariset (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 78 days.

(21) Appl. No.: 12/468,373

(22) Filed: May 19, 2009

(65) Prior Publication Data

US 2009/0290396 A1 Nov. 26, 2009

(30) Foreign Application Priority Data

May 20, 2008 (FR) ...................................... 08 53251

(51) Int. Cl.
*H02M 5/42* (2006.01)
*H02M 7/217* (2006.01)
(52) U.S. Cl. ............................ 363/86; 363/89; 363/127
(58) Field of Classification Search .................... 363/86, 363/89, 127, 52
See application file for complete search history.

(56) References Cited

U.S. PATENT DOCUMENTS

| | | | |
|---|---|---|---|
| 6,282,109 B1 * | 8/2001 | Fraidlin et al. ................... 363/89 |
| 6,625,046 B2 * | 9/2003 | Geissler .......................... 363/89 |
| 7,605,570 B2 * | 10/2009 | Liu et al. ....................... 323/207 |
| 2005/0213273 A1 | 9/2005 | Wang | |
| 2006/0034109 A1 | 2/2006 | Benabdelaziz et al. | |

FOREIGN PATENT DOCUMENTS

JP 2002-325355 11/2002

OTHER PUBLICATIONS

U.S. Appl. No. 12/468,534, filed May 19, 2009, Carcouet, et al.

* cited by examiner

*Primary Examiner* — Shawn Riley
(74) *Attorney, Agent, or Firm* — Oblon, Spivak, McClelland, Maier & Neustadt, L.L.P.

(57) ABSTRACT

The invention relates to a power supply system (3) intended to supply power to an electrical load (C), the system comprising:
 two input terminals, namely a negative terminal and a positive terminal, connected to a supply mains (A) delivering an AC voltage;
 an input capacitor (C1) connected to one of the terminals of the system;
 a rectifier module (33) for generating a DC voltage on a DC bus from the AC voltage;
 a bus capacitor (Cb) connected between a positive line (31) and a negative line (32) of the DC bus, and
 upstream of the input capacitor (C1), two normally-on bidirectional semiconductor transistors (T1, T2) connected in series, fabricated in a wide-bandgap material and able to operate in current-limiting mode.

7 Claims, 1 Drawing Sheet

CAPACITIVE POWER SUPPLY SYSTEM

The present invention relates to a capacitive power supply system.

A power supply system intended for supplying power to an electrical load C typically has two input terminals, namely a positive terminal and a negative terminal, connected to a supply mains applying an AC voltage, and a rectifier module consisting for example of a diode bridge for generating a DC voltage on a DC bus from the AC voltage of the supply mains. The system further includes a bus capacitor connected between a positive line and a negative line of the DC bus.

When the supply system is a resistive power system, it includes a resistor connected to an input terminal, upstream of the rectifier module. When the supply system is a capacitive supply system, it includes, upstream of the rectifier module, an input capacitor C1 connected in series with an input terminal. Currently, upstream of this input capacitor, a capacitive supply system includes a resistor designed to withstand the large current inrush created at start-up of the system via the input capacitor.

Even though the efficiency of a capacitive supply system is better than that of resistive supply systems, capacitive supply systems have the main drawback of being particularly bulky. This is because the input capacitor must be large so as to withstand the mains overvoltages. Moreover, the resistor connected in series with the input capacitor is useful only for limiting the large current inrush at system start-up. Now, once start-up has been completed, this resistor heats up and tends to dissipate a large amount of energy.

The object of the invention is to propose a capacitive supply system that is simple and compact and in which the current inrush occurring at start-up is limited and the dissipation losses under normal operation are reduced.

This object is achieved by a power supply system intended to supply power to an electrical load, the system comprising:
  two input terminals, namely a negative terminal and a positive terminal, connected to a supply mains delivering an AC voltage;
  an input capacitor connected to one of the terminals of the system;
  a rectifier module for generating a DC voltage on a DC bus from the AC voltage; and
  a bus capacitor connected between a positive line and a negative line of the DC bus,
characterized in that:
  the system includes, in series with the input capacitor and upstream thereof, two normally-on bidirectional semiconductor transistors connected in series, fabricated in a wide-bandgap material and able to operate in current-limiting mode.

According to one feature, the two semiconductor transistors of the system are of the JFET (Junction Field-Effect Transistor) type. Preferably, the two semiconductor transistors of the system are fabricated in silicon carbide or in gallium nitride.

According to another feature, the semiconductor transistors of the system are connected back to back, in such a way that the drain of a first semiconductor transistor is connected to the supply mains, the drain of a second semiconductor transistor is connected to the input capacitor connected downstream, the sources of the semiconductor transistors are connected together, and the gates of the two semiconductor transistors are also connected together and each is looped back onto the common potential of the sources.

Moreover, the supply may include a number of components for providing effective protection against overvoltages appearing on the supply mains, especially those induced by lightning strikes or inductive or capacitive load switching operations. The capacitive power supply system may thus be effectively protected without increasing its bulk.

Thus, the system may include a bidirectional transit diode or a varistor connected downstream of the two semiconductor transistors and upstream of the input capacitor, between a current line connected to the positive terminal and a current line connected to the negative terminal.

Likewise, the system may also include a resistor connected in parallel with the two semiconductor transistors.

Other features and advantages will become apparent in the following detailed description, which refers to an embodiment given by way of example and represented by the appended drawings in which.

Figure 1:
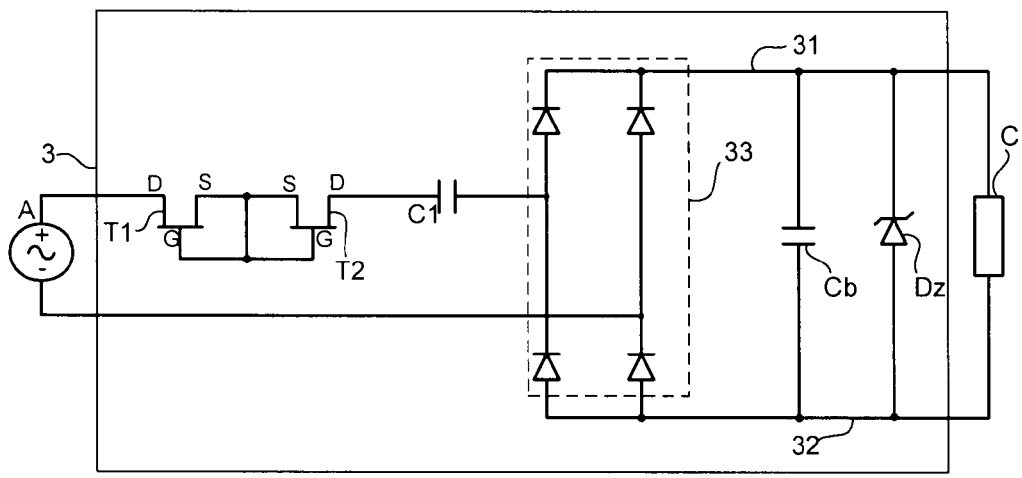
FIG. 1 shows a capacitive supply system according to the invention.

With reference to FIG. 1, as in the prior art, the supply system of the invention is intended to supply power to an electrical load C, and has two input terminals, namely a positive terminal and a negative terminal, which are connected to a power supply mains A applying an AC voltage, for example equal to 230 VAC or 400 VAC, generated at a frequency of for example 50 Hz. The system 3 also includes a rectifier module 33 consisting for example of a diode bridge for generating a DC voltage on a DC bus from the AC voltage of the supply mains A, a bus capacitor Cb connected between a positive line 31 and a negative line 32 of the DC bus, downstream of the rectifier module 33, and an input capacitor C1 connected, on one side, to the positive terminal and, on the other side, to one branch of the diode bridge. The system 3 may also include means for limiting the voltage delivered by the supply system, these consisting for example of a Zener diode Dz connected between the positive line 31 and the negative line 32 of the DC bus, downstream of the bus capacitor Cb.

Instead of the input resistor usually employed for limiting the current inrush at start-up, the system 3 of the invention comprises two, for example identical, bidirectional semiconductors T1 and T2 mounted in series and connected up as a current limiter. These two semiconductor transistors are produced in a wide-bandgap material, such as for example silicon carbide (SiC) or gallium nitride (GaN), thereby giving them a low on-state resistance $R_{DS,on}$ and the capability of withstanding high voltages (greater than 1000 V).

These semiconductor transistors T1, T2 are preferably JFET transistors. A JFET transistor is a known electronic component that includes a control gate (G), the function of which is to allow or prevent a current from flowing between a drain (D) and a source (S). Such a transistor is said to be of the normally-on type if the voltage $V_{GS}$ between the gate and the source is close to zero. This means that the drain-source path is conducting in the absence of control voltage $V_{GS}$. Conversely, a JFET transistor is said to be of the normally-off type if the drain-source path is not conducting in the absence of voltage $V_{GS}$ between gate and source. In the invention, the transistors T1, T2 are normally-on transistors.

Referring to FIG. 1, the transistors T1, T2 are connected up as a current limiter and are in series with the input capacitor C1. They are thus connected back to back in such a way that the drain (D) of the transistor T1 is connected to the AC mains A, the drain (D) of the transistor T2 is connected to the input capacitor C1, the sources (S) of the transistors T1, T2 are connected together, and the gates of the two transistors are also connected together and each is looped back onto the common potential of the sources (S).

This arrangement thus has the advantage of protecting the supply system 3 from overcurrents appearing when it is energized, by limiting the start-up current. At supply system start-up, the large voltage variation seen by the input capacitor C1 results in a large current inrush through the two transistors T1, T2. When the current increases and becomes greater than the current limit of the transistor T1, the transistor T1 switches to limit mode, causing its internal resistance to rise. Since its resistance increases, the voltage across the terminals of the transistor T1 increases. The same applies to the transistor T2. Thus, the large voltage variation occurring at start-up is absorbed by the transistors. Moreover, in normal operation, the on-state resistances of the two transistors T1, T2 are very low, thereby generating only small dissipation losses.

Figure 2:
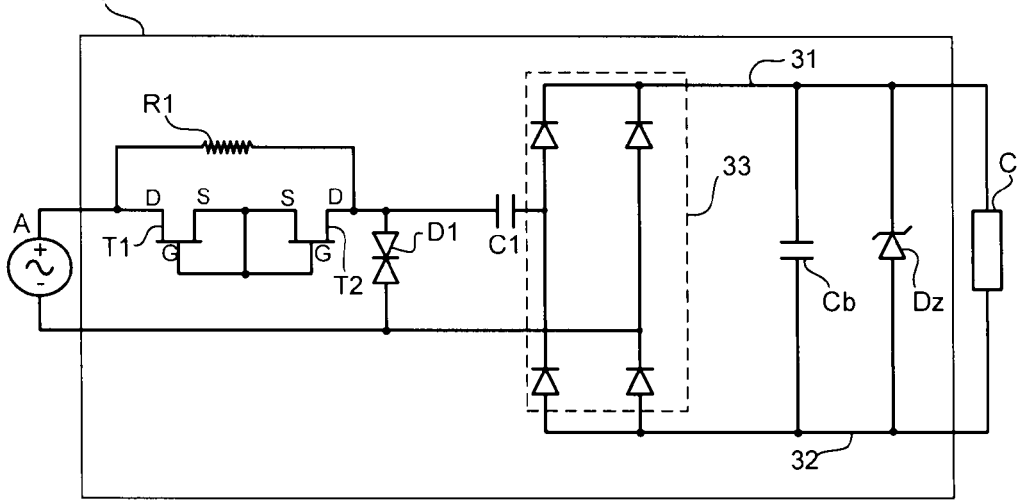
FIG. 2 shows an improvement of the capacitive supply system of the invention.

As shown in FIG. 2, it is also possible to protect the supply system 3 from overvoltages appearing on the supply mains A. According to the invention, to protect the supply system 3 from overvoltages due in particular to lightning on the supply mains A, the supply system 3 includes a clipper of the varistor type or a bidirectional transit diode D1 connected downstream of the transistor T2 and upstream of the input capacitor C1 between the current line connected to the positive terminal and the current line connected to the negative terminal of the system. The combination of the two transistors T1, T2 and of the clipper, consisting of the diode D1 in FIG. 2, enables the supply system 3 to be protected from highly energetic overvoltages without adversely increasing the volume of the device. The objective of the transit diode D1 is to fix the maximum voltage output by the system 3 and to provide a preferential path for the current that flows during an overvoltage. This transit diode D1 may conceivably be omitted if the bus capacitor Cb has a capacitance such that the voltage increase generated at its terminals during an overvoltage does not exceed the maximum voltage permissible by the supply system 3.

By operating in current-limiting mode, the JFET transistors considerably reduce, through their principle, the current caused by the overvoltage and therefore consequently reduce the energy absorbed by the supply system 3 compared with a conventional supply system having no transistors. Depending on the magnitude of the overvoltage, the remaining energy to be dissipated is distributed between the transit diode D1 and the two series-connected transistors T1, T2. Until an overvoltage close to the clipping voltage of the transit diode D1 is reached, most of the energy is dissipated in the transit. For higher overvoltages, the transistors T1 and T2 take over in dissipating the additional energy.

The current limit of each transistor T1, T2 is chosen in such a way as to be able to supply the start-up current necessary for the load of the electronic system 3. To optimize protection against lightning-induced overvoltages, the current limit is reduced to the minimum required for proper operation of the load C, so as to reduce the energy to be dissipated in the event of an overvoltage, whether in each transistor T1, T2 or in the transit diode D1. However, when the overvoltage is caused by the switching of inductive or capacitive loads present on the supply mains A, a large voltage variation appears at each switching operation. Since the output voltage of the device of the invention is fixed by the transit diode D1, all the rest of the overvoltages apply to the transistors T1, T2. The inductive current generated during the switching overvoltage may then be much higher than the current limit of the transistors T1, T2. In this case, the voltage across the terminals of the device 2 increases considerably until a transistor T1, T2 goes into avalanche mode and therefore no longer limits the current. The energy dissipated in this transistor is then considerable and may result in destruction of the component.

To solve the switching overvoltage problem, it is possible to design the transistors T1, T2 so that they can withstand the maximum energy. However, this solution is particularly expensive. Alternatively, it is possible to place a correctly sized resistor R1 in parallel with the two JFET transistors so as to be able to dissipate therein all the energy generated by the switching overvoltages. In this alternative, each transistor T1, T2 may therefore remain of modest dimensions and reasonable cost. The resistor R1 connected in parallel must therefore be sized so as to limit the voltage to below the maximum voltage withstood by the transistors T1, T2.

It should be noted that the current limit characteristic of JFET transistors depends on temperature. As the voltage rises during the overvoltage, dissipation is firstly observed in the transit diode D1 and then in the transistors T1, T2, resulting in progressive heating of the transistors and therefore a lowering of the current limit level. When a lightning-induced overvoltage occurs, this heating effect is favourable in that it makes it possible to limit the energy to be dissipated, since the current in the JFETs and in the transit diode D1 is itself limited. In contrast, in the presence of a switching overvoltage and an induced current, the current cannot flow through the JFETs, resulting in a rapid rise in the voltage until the avalanche threshold value of the JFETs is reached, after which the current can flow through the JFET transistors without any limitation. According to the invention, the resistor R1 connected in parallel with the JFETs then constitutes a path followed by the induced current the instant that the equation below is satisfied:

$$U_{max} = (I_{max} - I_{limJFET}) R1.$$

Thus, depending on the maximum value of $I_{max}$ (induced current), it is possible to define a resistor R1 such that $U_{max}$ is less than $U_{brJFET}$, so as to prevent the JFETs from going into avalanche mode. The temperature sensitivity of the JFETs therefore makes it possible to promote energy dissipation transfer to the resistor R1, thereby improving the robustness of the device.

Design example:

Inductive load on the 300 VA network with $I_{max}$=1.8 A;

Current limit of a JFET transistor: $I_{limJFET}$=0.1 A;

Maximum voltage withstand of a JFET transistor: $U_{brJFET}$=2000 V, giving R1=$U_{brJFET}/(I_{max}-I_{limJFET})$=1176 ohms.

Of course, without departing from the scope of the invention, other variants and detailed improvements may be imagined and the use of equivalent means may even be envisaged.

The invention claimed is:

1. A power supply system to supply power to an electrical load, the power supply system comprising:
   two input terminals, including a negative terminal and a positive terminal, connected to supply mains delivering an AC voltage;
   an input capacitor connected to one of the input terminals;
   a rectifier module configured to generate a DC voltage on a DC bus from the AC voltage;
   a bus capacitor connected between a positive line and a negative line of the DC bus; and
   two normally-on bidirectional semiconductor transistors connected in series with the input capacitor and upstream thereof, the two normally-on bidirectional semiconductor transistors being fabricated in a wide-bandgap material and configured to operate in a current-limiting mode, wherein sources of the two semiconductor transistors are connected to each other and to gates of the two semiconductor transistors.

2. The power supply system according to claim 1, wherein the two semiconductor transistors are JFET transistors.

3. The power supply system according to claim 2, wherein the two semiconductor transistors are fabricated in silicon carbide or in gallium nitride.

4. The power supply system according to claim 2 or 3, wherein the semiconductor transistors are connected such that a drain of a first semiconductor transistor is connected to the supply mains, and a drain of a second semiconductor transistor is connected to the input capacitor connected downstream.

5. The power supply system according to claim 1 the system further comprising a bidirectional transit diode or a varistor connected downstream of the two semiconductor transistors and upstream of the input capacitor, between a current line connected to the positive terminal and a current line connected to the negative terminal.

6. The power supply system according to claim 1 further comprising a resistor connected in parallel with the two semiconductor transistors.

7. The power supply system according to claim 1, further comprising a Zener diode connected between the positive line and the negative line of the DC bus and in parallel with the bus capacitor and the electrical load.

* * * * *